United States Patent [19]

Lo

[11] Patent Number: 5,549,408
[45] Date of Patent: Aug. 27, 1996

[54] CONNECTOR FOR BUILT-UP TOY FURNITURE

[76] Inventor: Wei W. Lo, No. 14, Lane 177, Guang-Fu Rd., Taipei, Taiwan

[21] Appl. No.: 390,177

[22] Filed: Feb. 17, 1995

[51] Int. Cl.⁶ ........................................ F16B 7/18
[52] U.S. Cl. .................... 403/218; 403/171; 403/174; 446/126
[58] Field of Search ...................... 403/217, 218, 403/219, 169, 170, 171, 172, 173, 174, 176, 178; 446/123, 126, 482

[56] References Cited

U.S. PATENT DOCUMENTS

| | | | |
|---|---|---|---|
| 1,198,263 | 9/1916 | Pajeau | 446/126 |
| 2,149,476 | 3/1939 | Tetzlaff | 446/126 |
| 2,709,318 | 5/1955 | Benjamin | 403/217 X |
| 4,589,236 | 5/1986 | McAllister | 403/174 X |
| 4,881,354 | 11/1989 | Pitt | 403/174 X |
| 5,013,245 | 5/1991 | Benedict | 446/126 X |
| 5,305,571 | 4/1994 | Trevino | 403/217 X |

FOREIGN PATENT DOCUMENTS

| | | | |
|---|---|---|---|
| 566256 | 10/1958 | Belgium | 403/170 |
| 93989 | 9/1897 | Germany | 446/126 |
| 2833428 | 2/1980 | Germany | 403/171 |
| 8903461 | 4/1989 | WIPO | 403/218 |

Primary Examiner—Kenneth J. Dorner
Assistant Examiner—Harry C. Kim
Attorney, Agent, or Firm—Pro-Techtor International

[57] ABSTRACT

A connector shaped like a circular block having a circular top recess for mounting a male vertical frame rod, a circular bottom recess for mounting a female vertical frame rod, a center through hole communicated between the circular top recess and the circular bottom recess for allowing the screw rod section of the male vertical frame rod to pass and to be threaded into the screw hole on the female vertical frame rod, a plurality of radial holes for mounting a respective horizontal frame rod, and a plurality of countersunk holes around the circular top recess for mounting a respective screw bolt to hold down each horizontal frame rod in each radial hole.

3 Claims, 6 Drawing Sheets

5,549,408

CONNECTOR FOR BUILT-UP TOY FURNITURE

BACKGROUND OF THE INVENTION

The present invention relates to connectors, and relates more specifically to such a connector for use with built-up toy furniture.

Conventional toy furniture are commonly made of fixed type on a very small scale. These miniature toy furniture may have sound producing means which attract children by giving off sound. Nowadays, these fixed type miniature toy furniture are less attractive to children. In place of conventional fixed type miniature toy furniture, built-up toy furniture have become more and more popular because they induce children to exercise their brains.

SUMMARY OF THE INVENTION

The present invention provides a connector which permits different miniature furniture frame rods to be connected together in different directions. According to the preferred embodiment of the present invention, the connector is shaped like a circular block having a circular top recess for mounting a male vertical frame rod, a circular bottom recess for mounting a female vertical frame rod, a center through hole communicated between the circular top recess and the circular bottom recess for allowing the screw rod section of the male vertical frame rod to pass and to be threaded into the screw hole on the female vertical frame rod, a plurality of radial holes for mounting a respective horizontal frame rod, and a plurality of countersunk holes around the circular top recess for mounting a respective screw bolt to hold down each horizontal frame rod in each radial hole.

DETAILED DESCRIPTION OF THE PREFERRED EMBODIMENT

Figure 1:
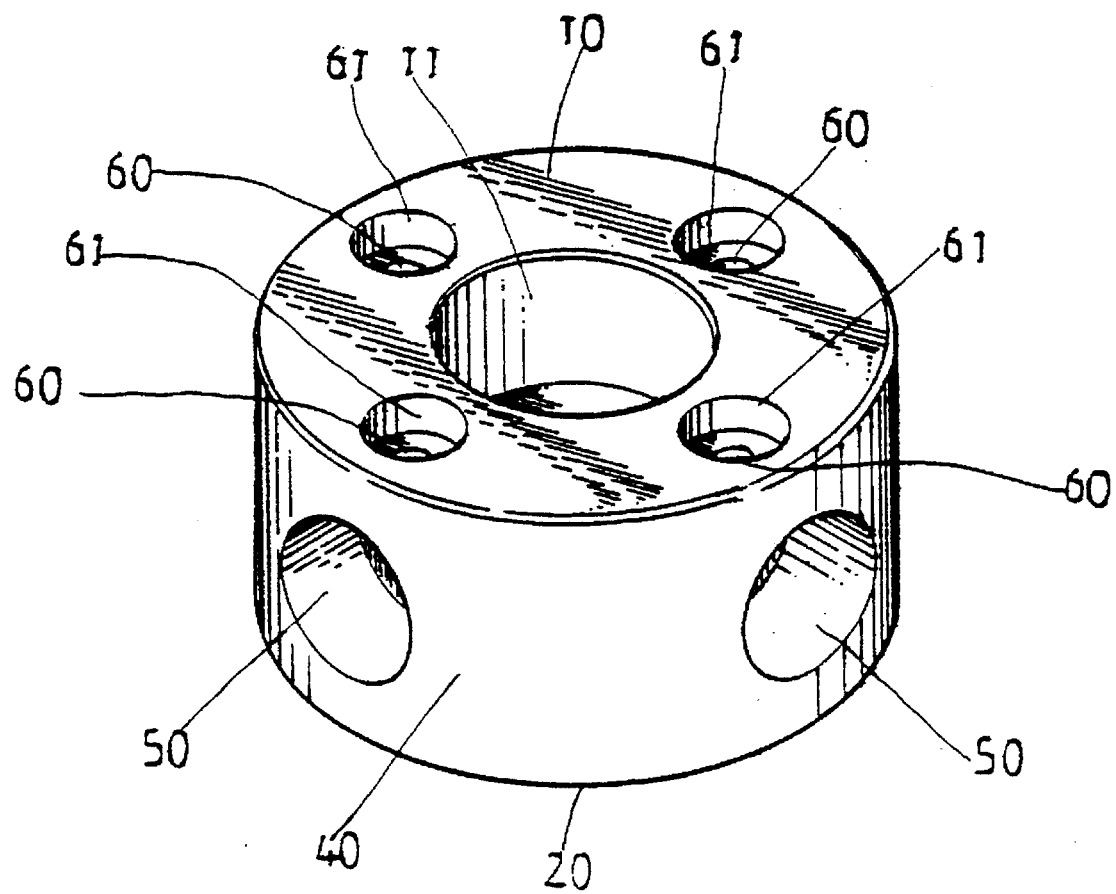
FIG. 1 is an elevational view of a connector according to the preferred embodiment of the present invention.
Figure 2:
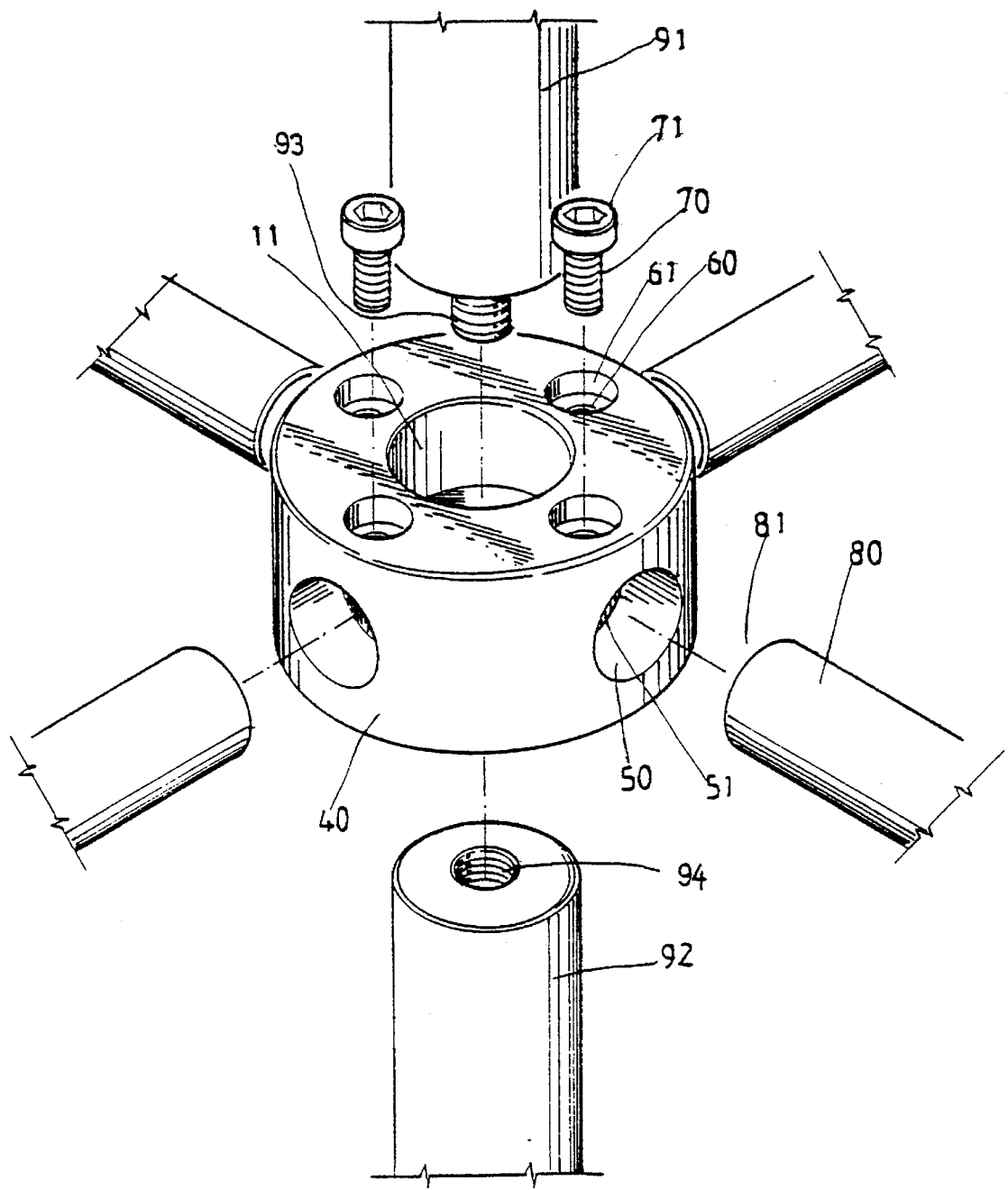
FIG. 2 is an exploded view of an installation example according to the present invention.
Figure 3:
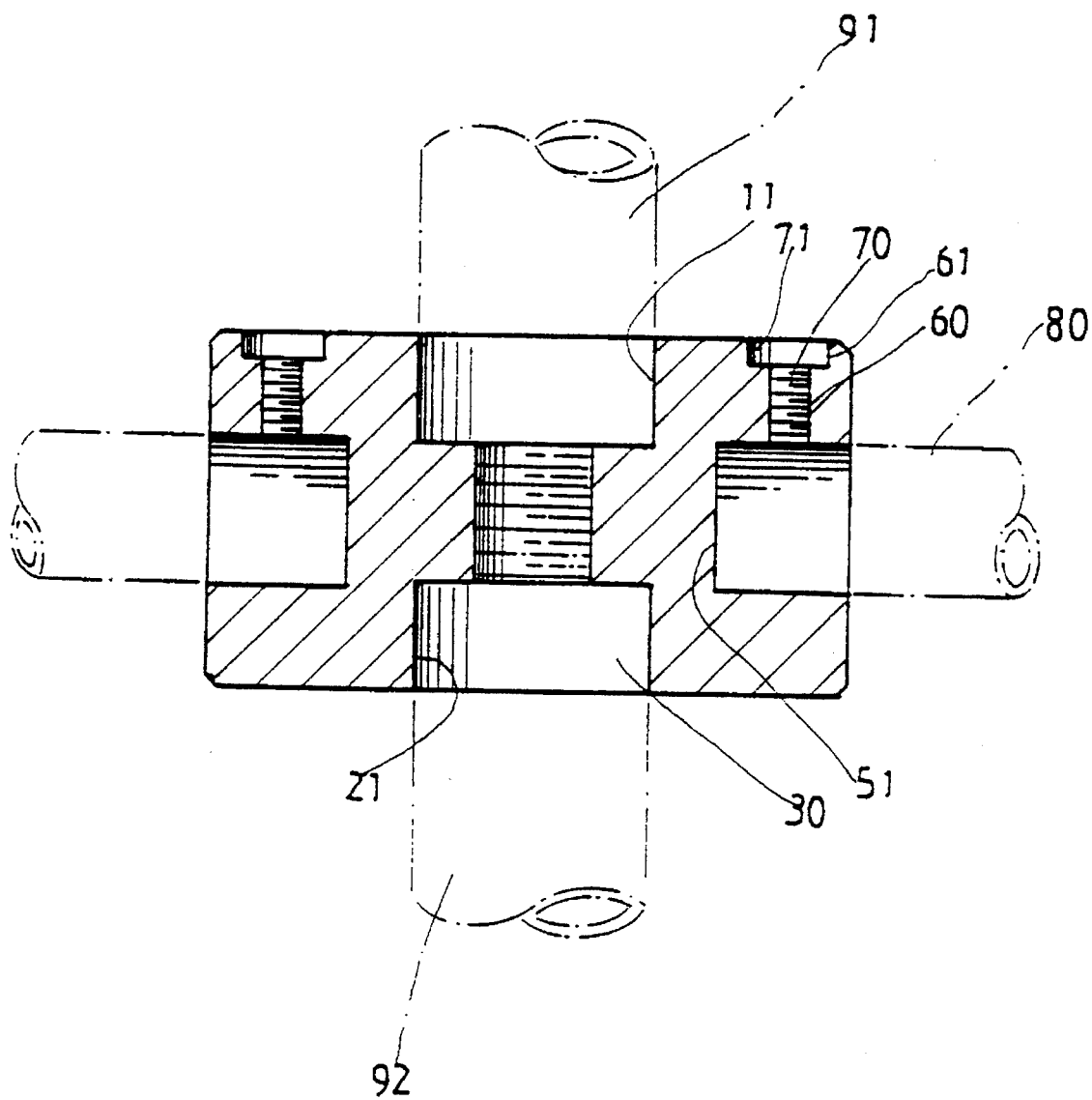
FIG. 3 is a sectional assembly view of FIG. 2.

Referring to FIGS. 1, 2, and 3, the connector shown is shaped like a circular block having a circular top recess 11 at the center of the top side 10 thereof, a circular bottom recess 21 at the center of the bottom side 20 thereof, and a center through hole 30 communicated between the circular top recess 11 and the circular bottom recess 21. A plurality of radial holes 50 are made around the periphery 40. A plurality of axial holes 60 are made on the top side 10 around the circular top recess 11 and respectively communicated with the radial holes 50. Each axial hole 60 has a widen outer end 61 for the head 71 of a screw bolt 70 so that the head 71 of the screw bolt 70 can be level with the surface of the top side 10.

Referring to FIGS. 2 and 3 again, horizontal frame rods 80 are respectively inserted into the radial holes 50 with the end 81 of each horizontal frame rod 80 respectively stopped against the bottom side 51 of each radial hole 50, then screw bolts 70 are respectively threaded into the axial holes 60 to hold down the horizontal frame rods 80; a male vertical frame rod 91 and a female vertical frame rod 92 are respectively inserted into the circular top recess 11 and the circular bottom recess 21 and then connected together by inserting the screw rod section 93 of the male vertical frame rod 91 into the center through hole 30 and then threading it into the screw hole 94 on the female vertical frame rod 92.

Figure 4:
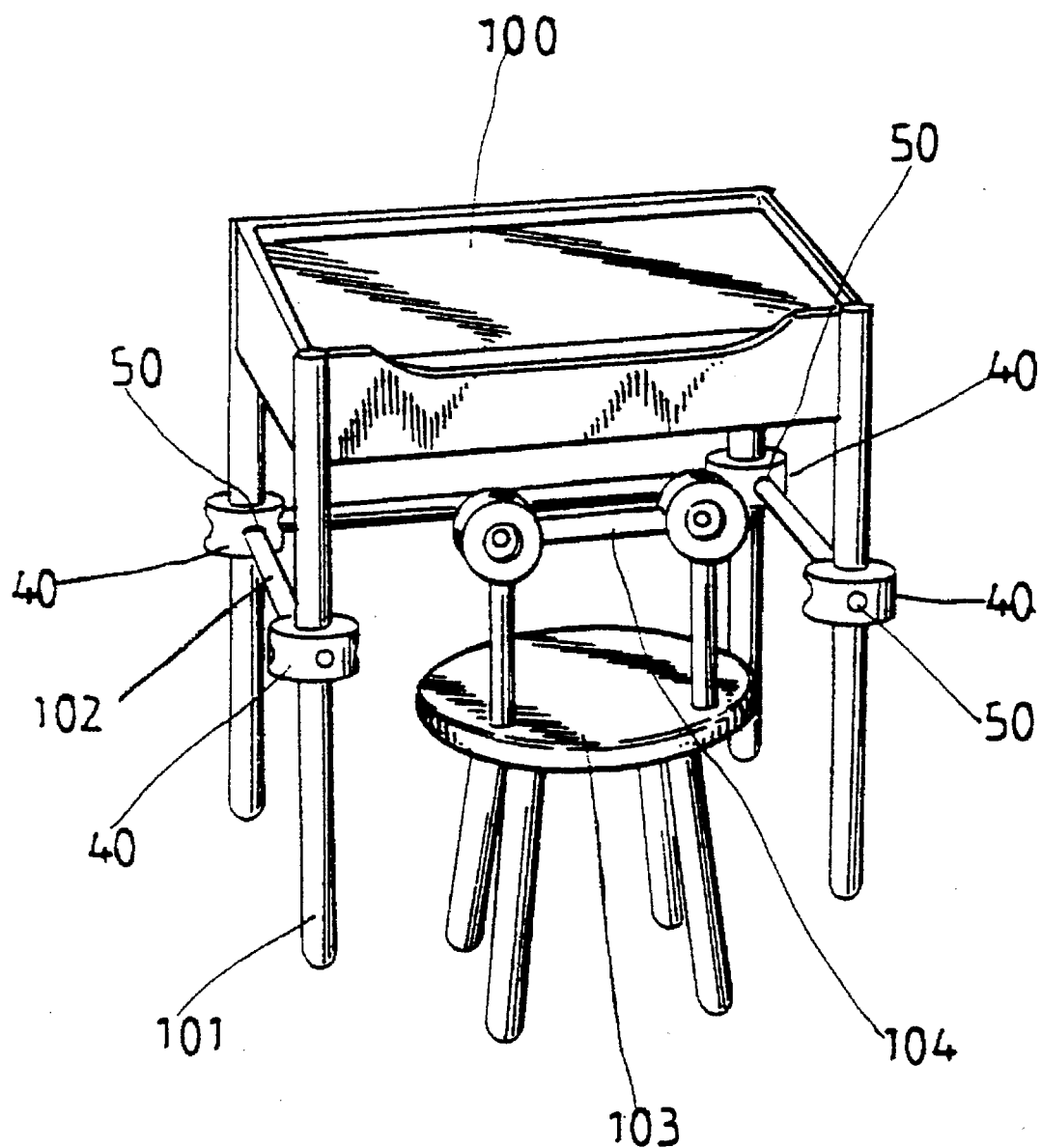
FIG. 4 shows a miniature toy desk and chair set according to the present invention.

FIG. 4 shows a miniature toy desk and chair set according to the present invention, in which: the legs 101 of the desk 100 are respectively comprised of two sections connected together by a respective connector of the present invention and stretchers 102 are fastened to the respective radial holes 50 on the connectors; a back 104 is built-up on the chair 103 by using two connectors of the present invention.

Figure 5:
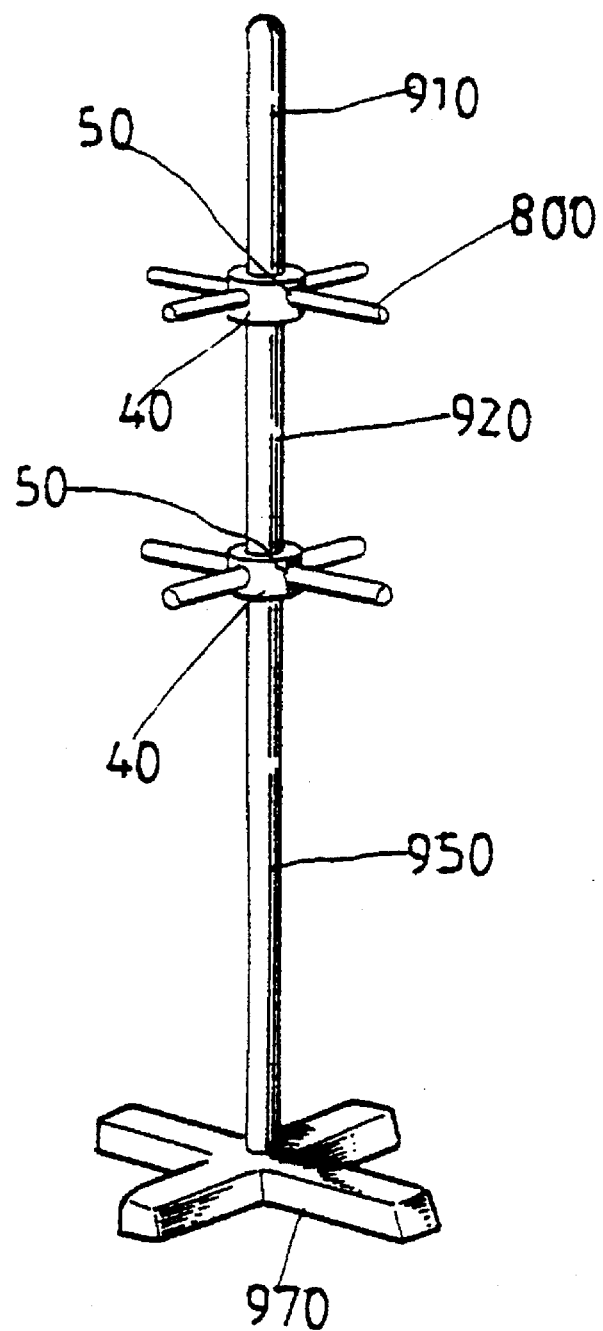
FIG. 5 shows a miniature toy clothes stand according to the present invention.

FIG. 5 shows a miniature toy clothes stand according to the present invention, in which: vertical frame rods 910, 920 and 950 are connected together by connectors of the present invention and supported on a base 970, and a plurality of horizontal frame rods 800 are respectively fastened to the radial holes 50 of the connectors for hanging toy clothes, etc.

Figure 6:
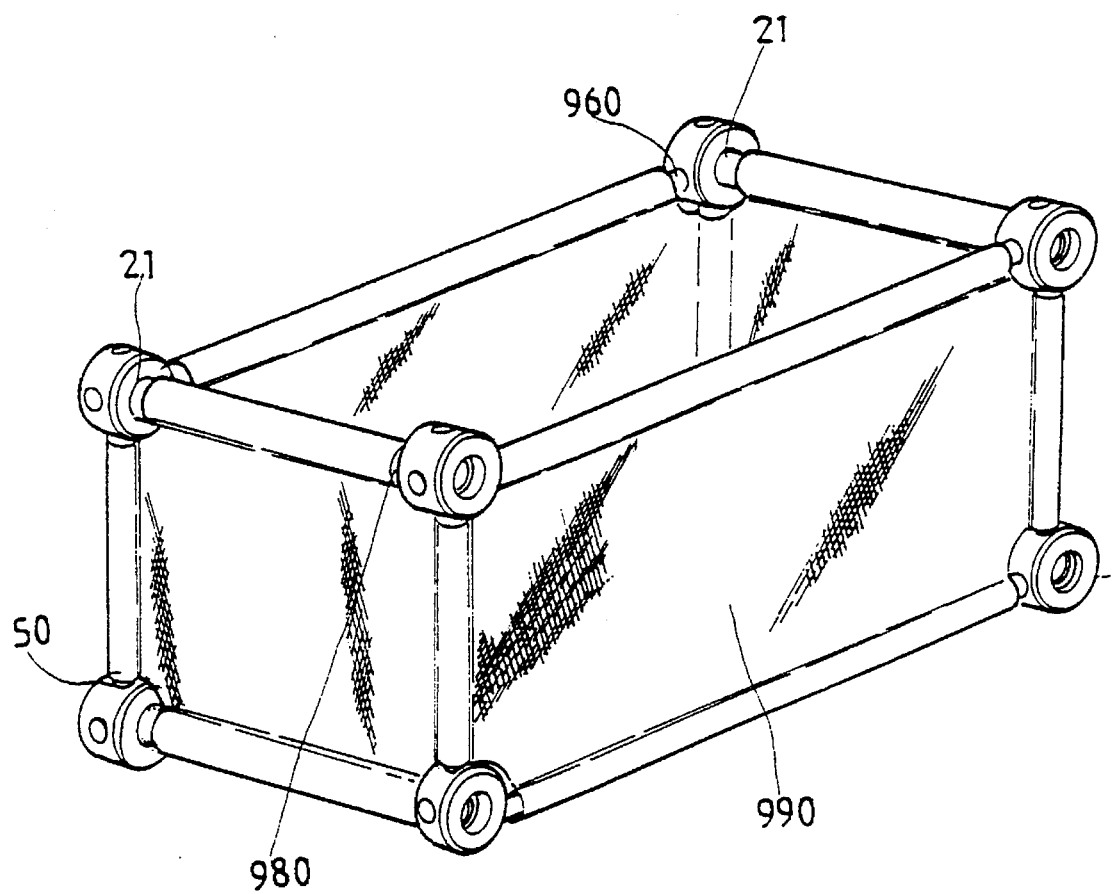
FIG. 6 shows a miniature toy storage case according to the present invention.

FIG. 6 shows a miniature toy storage case according to the present invention, in which: vertical frame rods 960 and horizontal frame rods 980 are respectively fastened to the circular bottom recesses 21 and radial holes 50 of the connectors, and canvas panels 990 are stretched among the vertical frame rods 960 and the horizontal frame rods 980 around the four sides and the bottom side.

What is claimed is:

1. A connecting mechanism comprising:

generally cylindrical one-piece connector with a flat top side and a flat bottom side, said top side including a first circular recess and said bottom side including a second circular recess, said connector further including a central through hole connecting said first recess and said second recess, said connector further including a plurality of radial holes around a periphery of said connector and a plurality of axial holes in said top side of said connector, said axial holes being in communication with said respective radial holes; and at least one horizontal frame rod being inserted into one of said radial holes and being secured within said one of said radial holes by a securing means disposed within one of said axial holes in communication with said one of said radial holes, and a first vertical frame rod including an elongated main body and a male threaded screw rod section, wherein said main body of said first vertical frame rod being substantially longer than said screw rod section, and second vertical frame rod including an elongated main body with a female threaded screw hole provided at one end of the main body, wherein said first and second vertical frame rods being inserted into said first and second recesses, respectively, said screw rod section of said first vertical frame rod being threaded into said screw hole of said second vertical frame rod to secure said vertical frame rods in position in said respective first and second recesses of said connector.

2. The connecting mechanism of claim 1 wherein:

said axial holes are countersunk holes.

3. The connecting mechanism of claim 1 wherein:

said securing means is a screw bolt.

* * * * *